INVENTOR
DIGHTON A. ROBINSON
By Paul&Paul
Attorneys

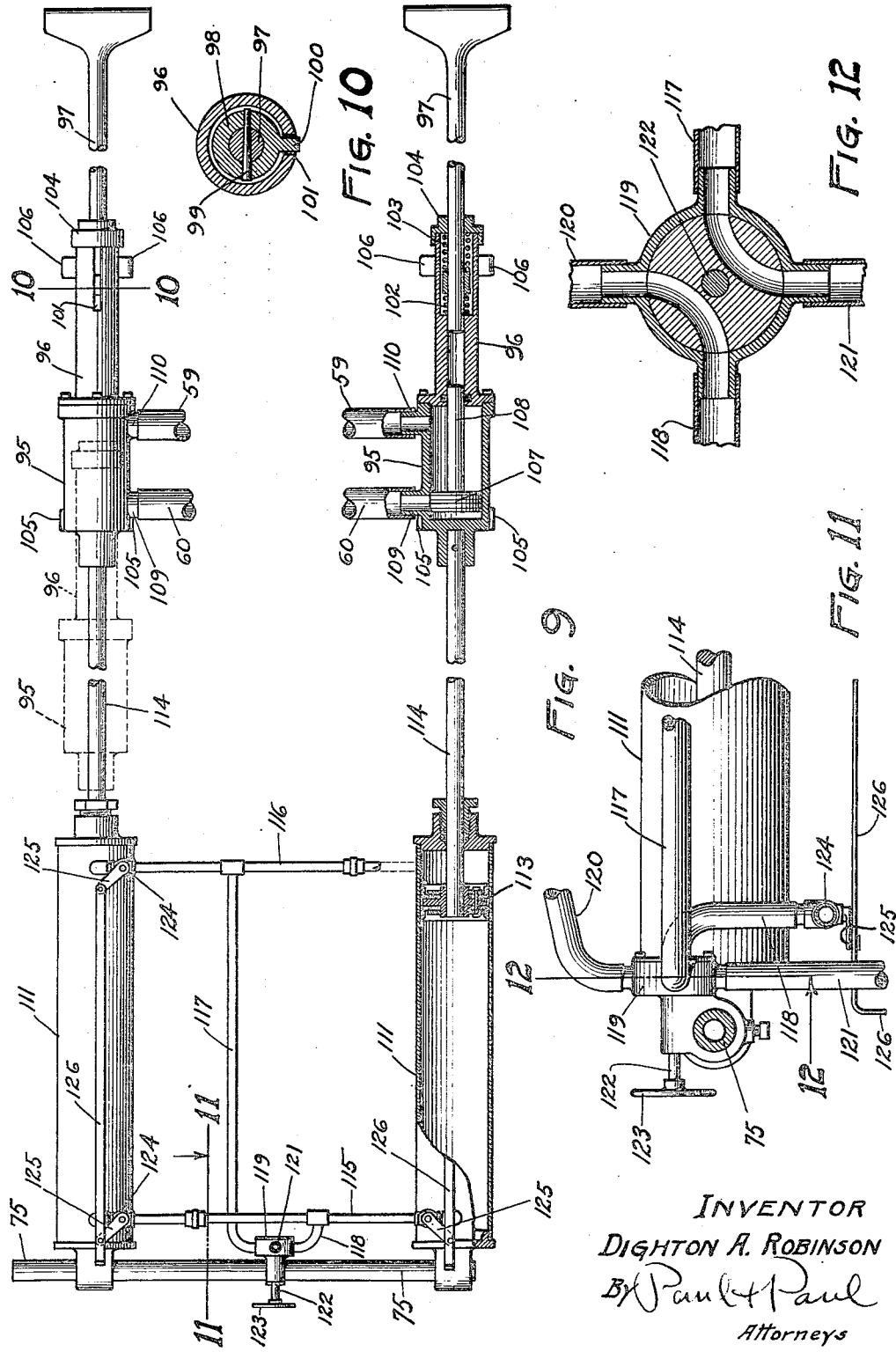

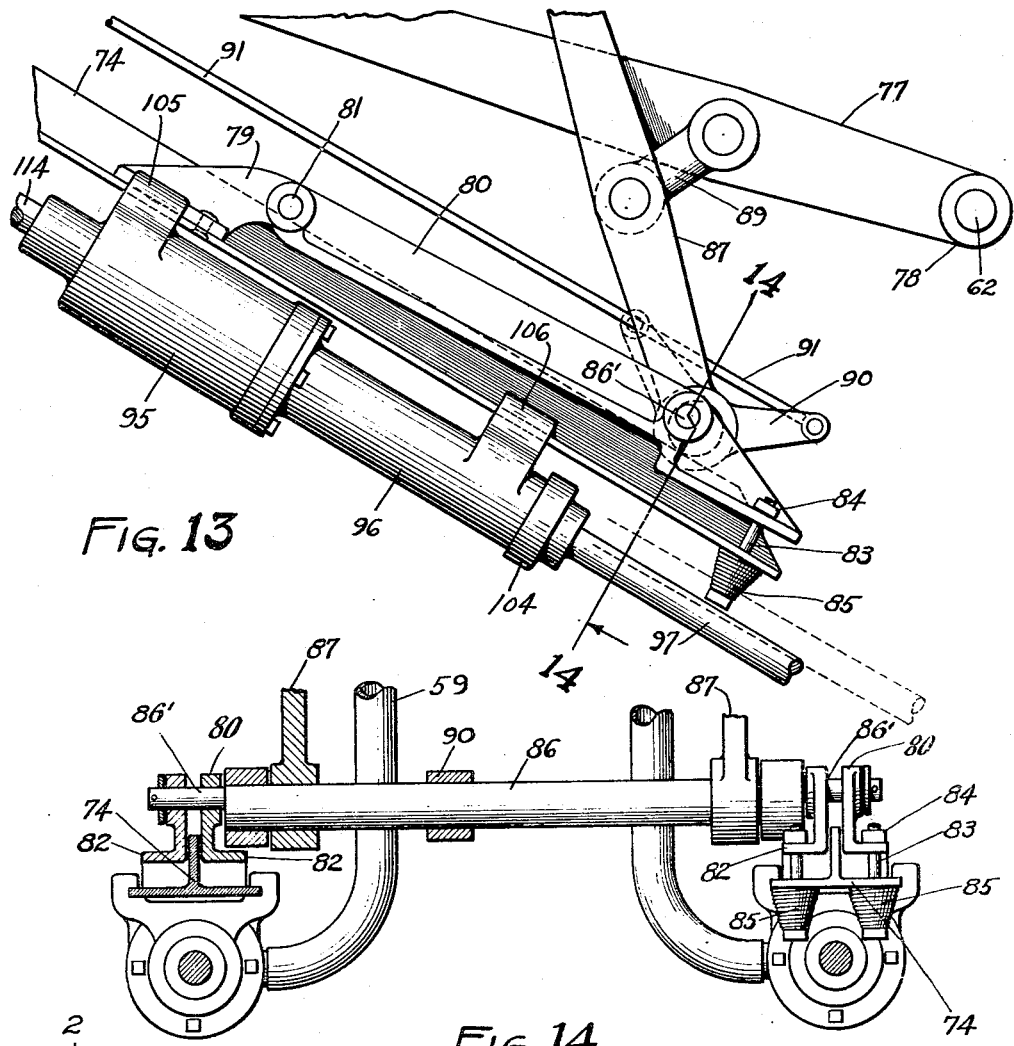
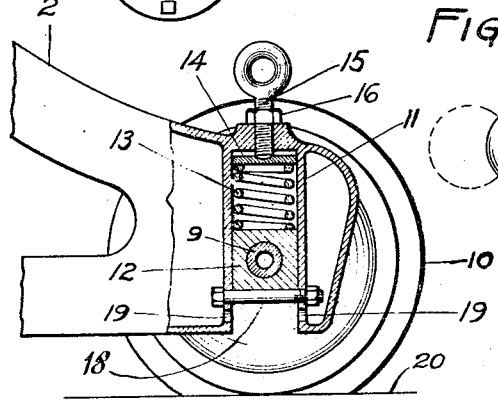
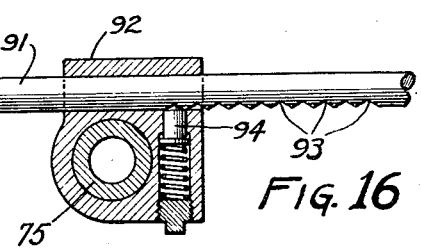

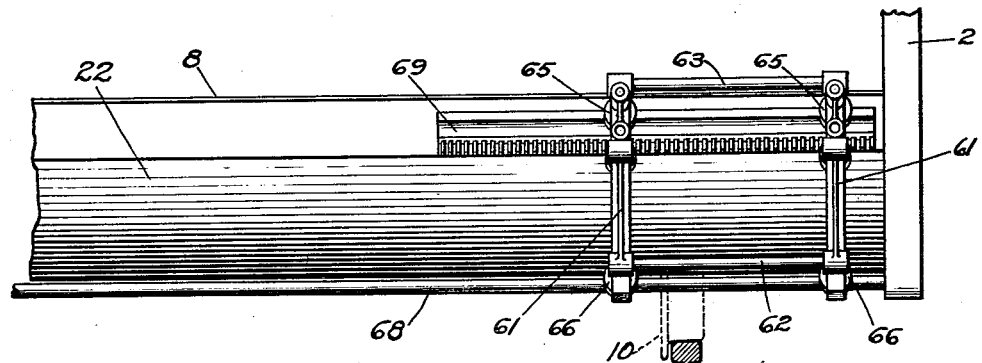
Fig. 17
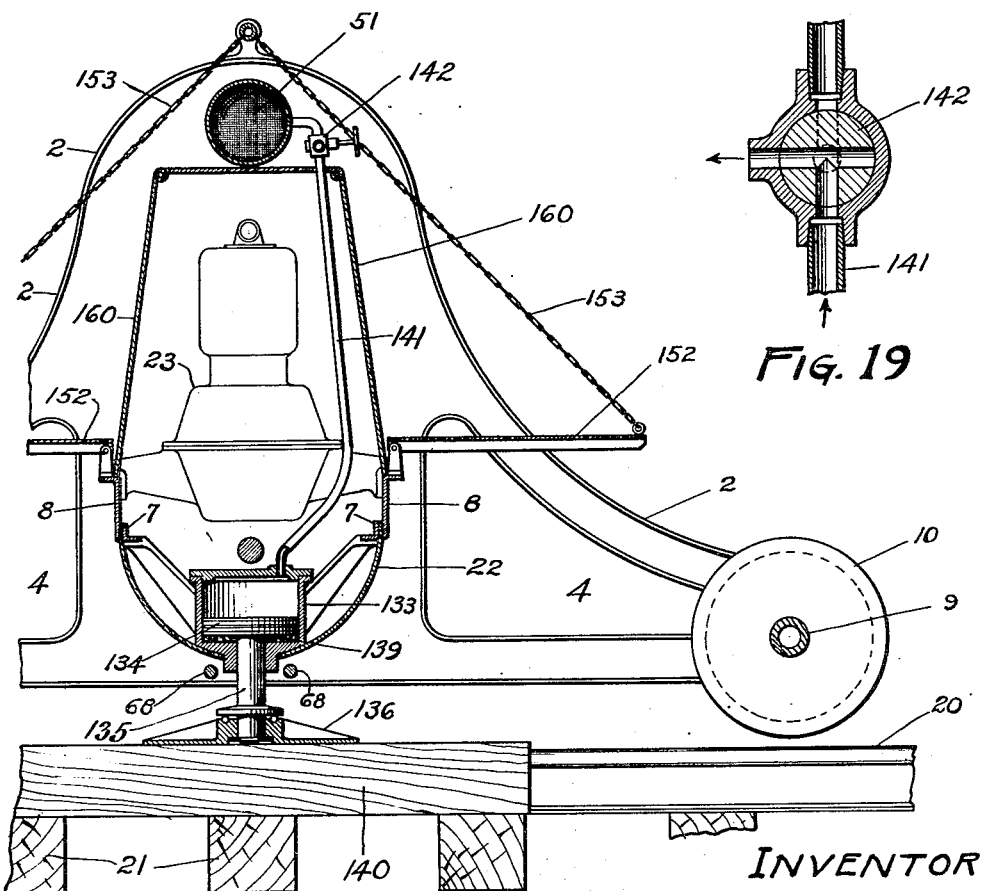
Fig. 19
Fig. 18
INVENTOR
DIGHTON A. ROBINSON
By Paul & Paul
Attorneys

D. A. ROBINSON.
TIE TAMPING MACHINE.
APPLICATION FILED DEC. 19, 1921.

1,415,194.

Patented May 9, 1922.
9 SHEETS—SHEET 9.

INVENTOR
DIGHTON A. ROBINSON
By Paul & Paul
Attorneys

UNITED STATES PATENT OFFICE.

DIGHTON A. ROBINSON, OF MINNEAPOLIS, MINNESOTA.

TIE-TAMPING MACHINE.

1,415,194.   Specification of Letters Patent.   Patented May 9, 1922.

Application filed December 19, 1921. Serial No. 523,539.

*To all whom it may concern:*

Be it known that I, DIGHTON A. ROBINSON, a citizen of the United States, resident of Minneapolis, in the county of Hennepin and State of Minnesota, have invented certain new and useful Improvements in Tie-Tamping Machines, of which the following is a specification.

This invention relates particularly to improvements in the tie tamping machine illustrated and described in my application for Letters Patent filed February 21st, 1921, Serial No. 446,871.

The object of the present invention is to improve and simplify the construction and arrangement of the various mechanisms illustrated and described in my said former application; to provide improved means for supporting and adjusting the tamping tools and the operating guns; to provide means for adjusting the machine or car frame upon its supporting trucks thereby raising or lowering the tamping bars and their supporting mechanisms, so as to accommodate the machine for use upon rails of different depths, and to provide means for elevating and turning the car and the mechanism carrying frame so as to permit the same to be readily removed from the track.

Other objects will appear from the following detailed description in connection with the accompanying drawings in which, Figure 1 is a vertical section of a tamping machine embodying my invention, taken on line 1—1 of Figure 2, looking in the direction of the arrow;

Figure 9 is a detail partly in section, looking from below and showing two of the tamping bars and their operating guns, and the means for adjusting the position of the tamping bars and guns;

Figure 10 is a detail section on line 10—10 of Figure 9;

Figure 11 is a detail section on line 11—11 of Figure 9;

Figure 12 is a detail section on line 12—12 of Figure 11;

Figure 13 is an elevation of a portion of one of the guns and its supporting mechanism.

Figure 14 is, in its left-hand portion, a section on line 14—14 of Figure 13, looking in the direction of the arrows, while the right hand portion of this figure shows the same parts in elevation;

Figure 15 is a detail illustration of the spring controlled means for supporting the machine frame upon the trucks.

Figure 16 is a detail of the rod for adjusting the tool supporting carriage.

Figure 17 is a partial elevation of the base member and the main carriage showing also the relation of the carriage to one of the track rails.

Figure 18 is a partial section and elevation showing the means for raising the machine to permit it to be turned and removed from the track.

Figure 19 is a detail of the valve controlling passage of air to and from the raising cylinder.

*The frame.*

Figure 2:
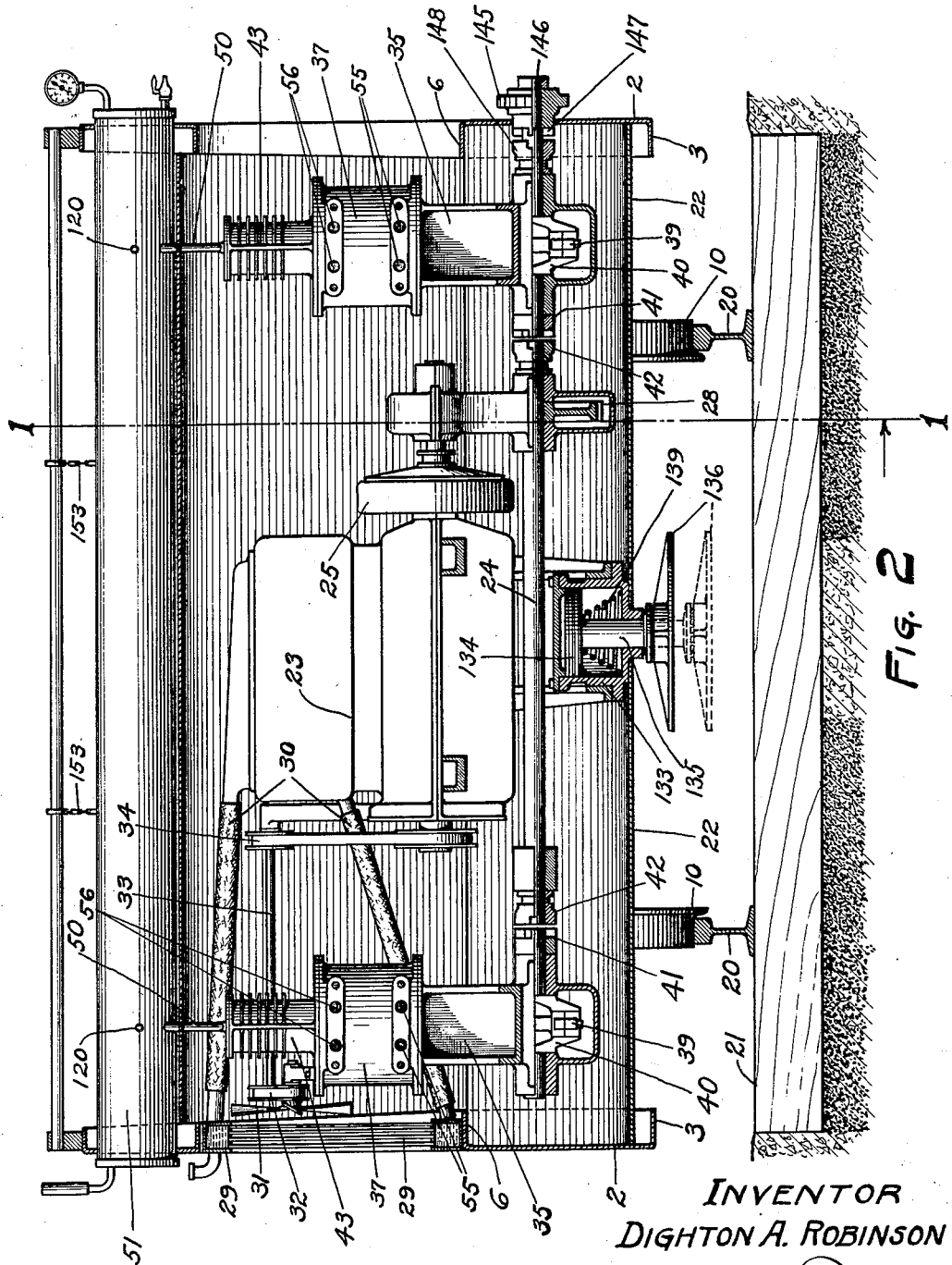
Figure 2 is a vertical section on line 2—2 of Figure 1, looking in the direction of the arrow.

The main frame of the machine, as here shown, is preferably formed of two end members 2, 2, which may be made of any suitable material, but which I prefer to construct of sheet steel, stamped or pressed into the desired form. The outer edge of each member is preferably provided with an inwardly extending flange (Figure 2). Each member is also preferably provided with the openings 4, 4 and 5. Surrounding each opening I preferably provide an inwardly extending flange 6 (Figure 2). The flanges 3 and 6 form stiffening ribs for the end members 2, 2. The end members 2, 2 are preferably spaced apart the distance desired for the width of the machine, and these members are rigidly connected together by the transversely extending angle bars 7, 7 and 8, 8. These bars extend across from one end member to the other, and have their ends suitably connected to the members 2, 2. The end members 2, 2 also provide bearings for the axles 9, 9, which carry, preferably secured rigidly thereto, the small car wheels 10, 10. I have shown and prefer to use two axles 9, 9 for each machine, each axle being provided with a pair of rigidly secured small car wheels 10, 10.

Frame adjustment.

The ends of the members 2 are provided with vertically extending housings 11, in which are arranged vertically sliding bearing blocks 12, which form bearings for the ends of the axles 9, (Figure 15). As here shown each of the blocks 12 is engaged by a spiral spring 13, arranged between said block and a plate 14 at the upper end of the housing. An adjusting screw 15, passing through a threaded opening in the top of the housing, engages the plate 14. Said screw is preferably provided with a lock nut 16. A bolt 18 passes through holes in the housing below the bearing block 12, and supports said block against the tension of the spring 13. A plurality of holes 19 provided in the walls of the housing permit adjustment of the bolt 18.

By supporting the axles 9 in this manner I am enabled to raise or lower, to a certain extent, the frame of the machine, and thereby to adjust vertically said frame with respect to the track upon which the wheels of the machine may be resting.

Figure 1:
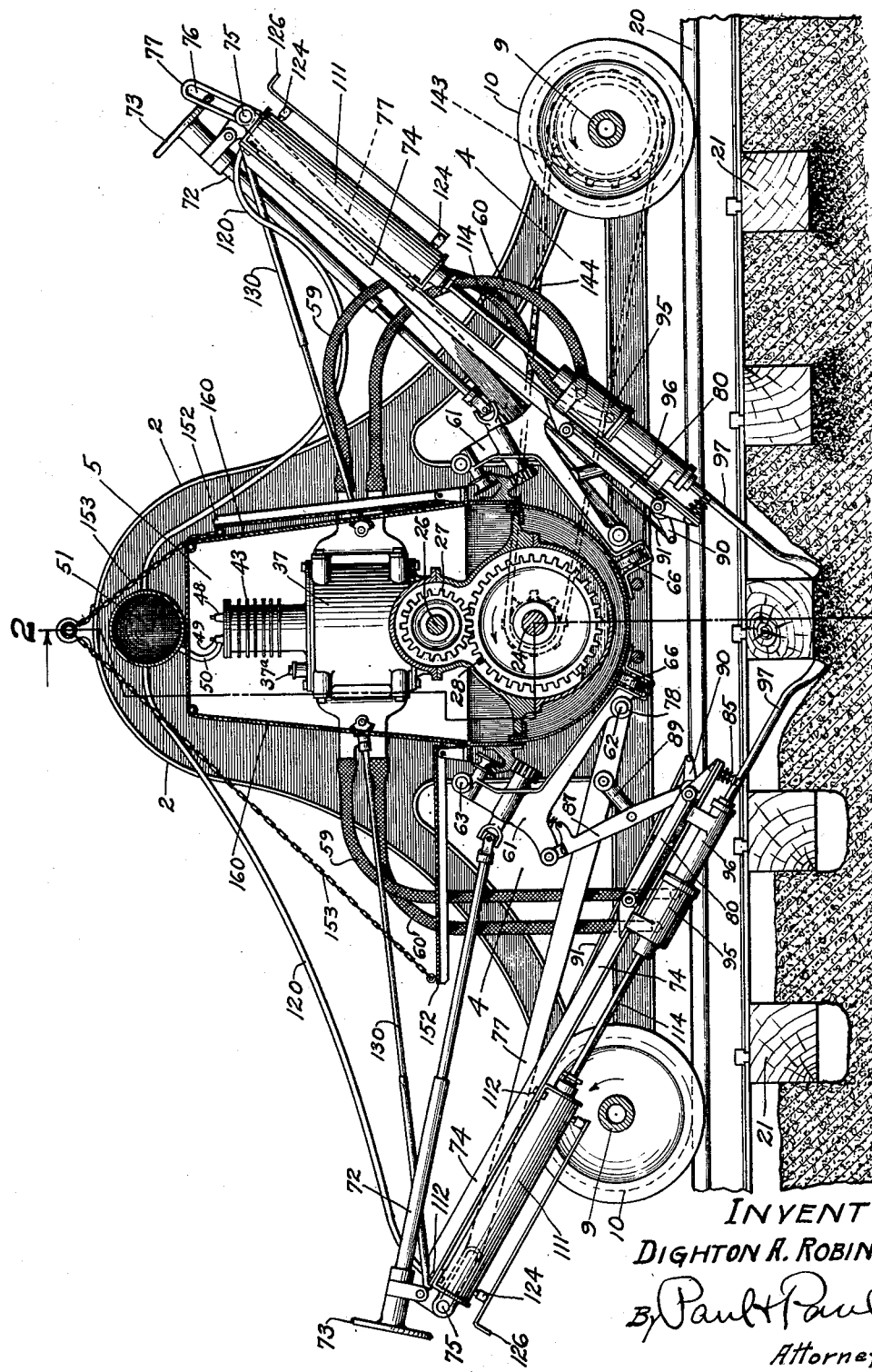
Figure 4:
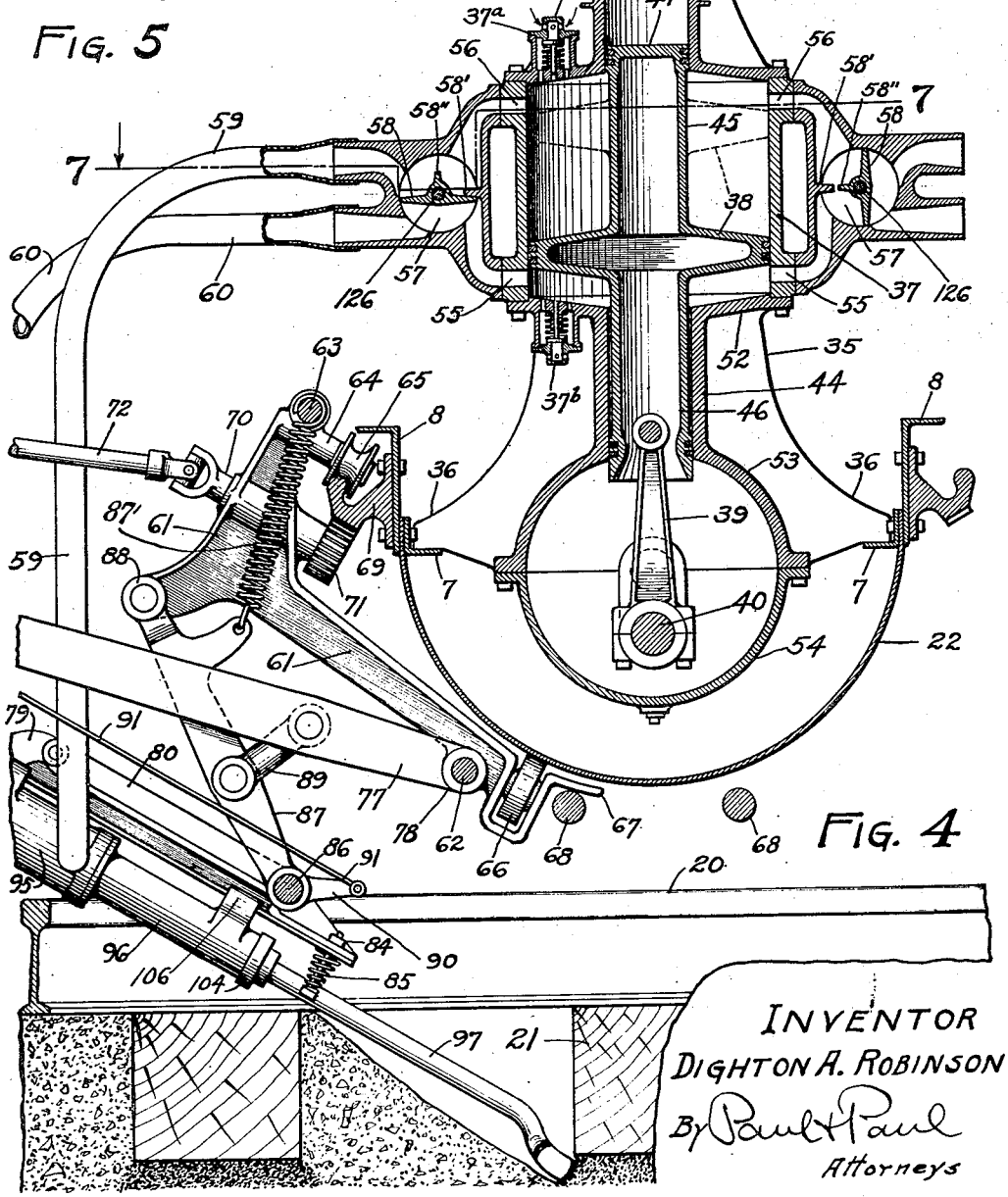
Figure 4 is a vertical section on a plane extending through one of the pulsators and lengthwise of the machine.

I have indicated in the drawings the wheels 10 as resting upon suitable rails 20, said rails being supported by ties 21. The rails 20 may be of greater or less depth, and, to allow for differences in the depth of the rails, I mount the axles 9 in the vertically adjustable bearing blocks as hereinbefore described. With this construction and arrangement the ends of the tamping bars will, when the machine is ready for use, stand at the desired level just below the lower edges of the ties (Figures 1 and 4).

Arrangement of base member.

I preferably provide the frame of the machine with a transversely extending base member 22 (Figure 4), which is preferably formed of heavy sheet metal, such as boiler iron, and is of substantially semi-cylindrical form. This member preferably has its upper edges arranged between and firmly bolted to, the transversely extending angle bars 7 and 8 (Figure 4). The ends of the base member 22 are suitably secured to the vertical inner walls of the members 2, 2. This base member, with the end members 2, 2 and the angle bars 7, 8, form a very light but rigid frame which, supported upon the axle 9, and wheels 10, forms a small car adapted to be moved along the rails of a railroad track.

Motor.

Arranged above the base member 22 and preferably located substantially at the center of the car, is a suitable motor 23 preferably supported upon the angle bars 8 (Figures 2 and 18). This motor may be of any suitable type, steam, electric or gasoline. I have represented in the drawings a gasoline or internal combustion engine arranged to drive a shaft 24, through a suitable clutch 25 (Figure 2), shaft 26, pinion 27, and gear 28 (Figure 1). I have also shown this engine provided with a radiator 29 and circulating pipes or tubes 30. I have also shown the engine provided with a fan 31, arranged to be driven through a belt 32 from shaft 33, which in turn is driven through a belt 34 from the crank shaft of the engine.

It will be understood, however, that I do not limit myself to any of these details of construction of the motor, or power plant, and, without departing from my invention, any other suitable motor may be substituted for that shown herein.

Pulsators.

I also preferably provide at each side of the motor 23 a double acting air pump 35, of the type generally designated a "pulsator," each pump being preferably provided with lugs 36 by which it is supported upon the angle bars 7 (Figure 4). Each pump is provided with a cylinder 37, a double acting piston 38, a connecting rod 39 and a crank shaft 40, preferably in line with the shaft 24. Each crank shaft is provided with a clutch member 41, adapted to be engaged by a clutch member 42, arranged on the shaft 24, so that when said clutch members are engaged the crank shaft 40 is driven and the piston 38 is reciprocated in the cylinder 37. Compensating valves 37$^a$ and 37$^b$ are preferably provided in the upper and lower cylinder heads, respectively, of the cylinder 37 through which air is admitted to the cylinders, while the device is in operation. When sufficient air has been drawn through the valves 37$^a$ and 37$^b$ to produce the required pressure in the cylinder for the proper operation of the air guns, said valves automatically close, and remain closed until the pressure in the cylinders begins to lower, due to leakage, etc., when they again open and admit air to the cylinders thereby retaining a constant pressure for the operation of the air guns. Other suitable devices well known in the art may be substituted for the compensating valves.

As the piston moves in one direction the air in the cylinder will be forced out of one end of said cylinder, and air will be drawn into the cylinder at the other side of the piston. As the piston moves in the other direction the action will be reversed.

The cylinder 37 is preferably provided at its upper end, and as a part of its upper head, with the cylindrical chamber 43, and at its lower end, and as a part of its lower head 52, with a reduced portion 44. The piston is provided with the upper piston stem 45, and with the lower stem 46 to which the connecting rod 39 is connected. I prefer to form the piston 38, and the stems 45 and 46 hollow as shown, the upper end of the stem 45, however, being closed by the wall 47, whereby said stem forms, with the chamber 43, a small air compressor, by means of which air admitted, through a suitable inwardly opening valve 48, may be compressed and forced out of the chamber through a valve 49, and a pipe 50 into a reservoir 51.

The lower cylinder head 52 is preferably formed integrally with the reduced portion 44, and with the upper half 53 of the pulsator crank case, the lower half 54 of said crank case being formed separately and secured to the upper half by suitable means.

The cylinder 37 is provided with the lower ports 55 (preferably four in number) and with the upper ports 56, also four in number. A port 55, and a corresponding port 56 both communicate with a valve chamber 57, in which is placed a rotatable valve 58. When this valve is in the position shown at the left in Figure 4, the ports 55 and 56 are in open communication with the lengths of hose 59 and 60 leading to the air guns hereinafter described. When the valve 58 is in the position shown in Figure 5 the air passes freely from one end of the cylinder to the other as the piston is reciprocated.

Figure 5:
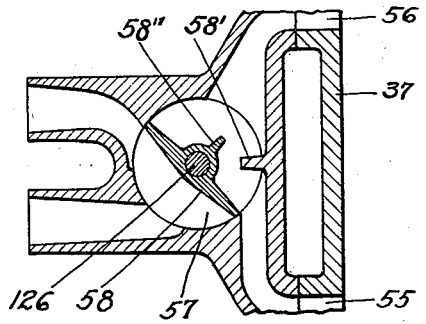
Figure 5 is a detail of one of the air controlling valves of the pulsator.
Figure 6:
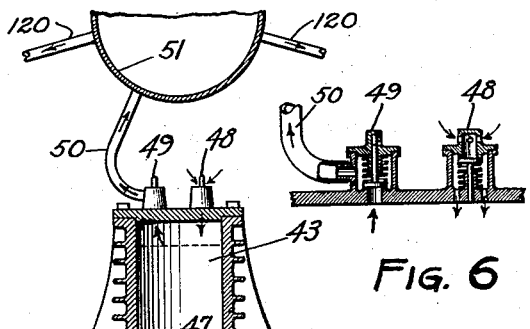
Figure 6 is a detail of the valves arranged in the head of the pulsator.

Any valve 58 may be adjusted to any position between that shown in Figure 5 to that shown at the right in Figure 4, and in order to throttle the air passage, between a lower port 55 and the corresponding upper port 56, I provide on the cylinder wall a flange 58' in line with the axis of the valve 58, and a corresponding flange 58'' on the hub of the valve 58. When the valve 58 is in the position shown in Figure 5 the passage between the ports 55 and 56 is open to its greatest extent. When the valve is in the position shown at the right in Figure 4, this passage is reduced to its smallest area. By rotating the valve the passage may be open to any degree between these two extremes. This adjustment of the passage between the ports is provided so that when any tamping tool is not in use the air pressure for operating the other tools or any tool may be regulated.

*Means for lubricating air gun.*

In order to provide efficient lubrication of the air guns hereinafter described, I prefer to lead the tube or hose 60 connected to the lower end of the cylinder 37, to the upper end of the air gun cylinder 95, hereinafter described, so that by providing the crank case 54 with the lubricating material, the same will work around the piston stem 46 into the lower part of the cylinder 37, and, acting on the principle of the splash system of lubrication, more or less of the lubricating material will be forced by the piston 38 through the tube or hose 60 into the upper end of the air gun cylinder 95. As said cylinder stands in an inclined position said lubricating material will work downward by gravity and will effectively lubricate said air gun.

*Main carriages.*

Figure 3:
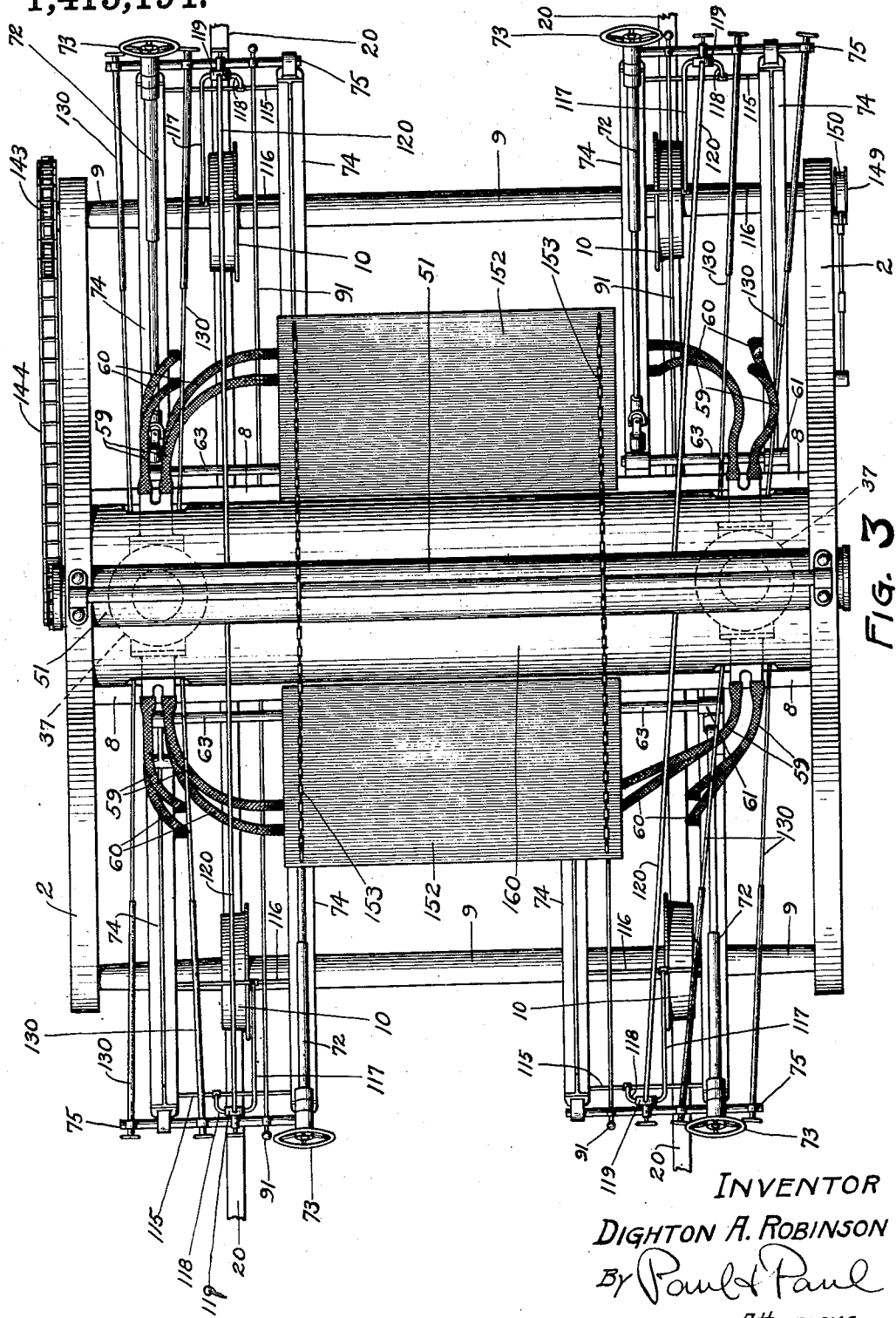
Figure 3 is a plan view of the machine with the tamping tools and the individual tool supporting carriers omitted.

I preferably provide each machine with four laterally movable main carriages, each carriage carrying two tamping tools, and the operating mechanism therefor. The carriages are preferably located as shown in Figure 3 at opposite sides of the base member, one carriage being arranged near each side of the car frame, which, in the construction shown, brings one of the carriages above each of the car supporting wheels 10. The tamping tools, with their operating guns, are located near the sides of the carriages, so that one tamping tool is arranged to tamp beneath the edge of the tie from the inside of the railroad rail to the desired distance towards the center of the space between the rails, while the other tamping tool is arranged to operate from the outside ledge of the rail to the end of the tie. With this arrangement of four tamping tools on each side of the base member, the work of tamping under both edges of a tie, the tools being in the positions indicated in Figure 1, is quickly accomplished.

*Tool supporting carriages.*

I also provide a tool supporting carriage independently adjustable in a vertical plane upon each main carriage, each carrying a pair of tamping tools, each tool being independently adjustable upon said supporting carriage. For convenience I designate these carriages as the "main carriage" and the "tool supporting carriage" respectively.

*Construction of main carriages.*

Each of the main carriages is preferably in the form of a rectangular frame, comprising a pair of side bars or castings 61 (Figures 3, 4, 17 and 20), a lower transverse rod 62, and an upper transverse rod 63. Each side bar is provided at its upper end with a bearing 64, for the shaft of a grooved carrying wheel 65. It is provided at its lower end with a recess in which is journaled a bearing wheel 66. The lower end of the side-bar is in the form of a lug 67, which extends between the base member 22, and a transverse supporting rod 68. This rod preferably extends the full width of the machine, and is suitably supported in the end members 2, 2 of the frame. A transverse rack and track-bar 69 is secured to the angle bar 8, and the carriage is supported thereon by the engagement of the grooved wheel 65 with said track bar. The lower end of the main carriage extends below the base member 22 and the wheels 66 bear upon said base member. (Figures 1 and 4).

The main carriage is provided with a pinion 71, engaging the rack on the bar 69, this pinion being mounted upon a short shaft 70, to which is connected preferably by a universal joint, a telescoping operating rod 72 extending to the end of the machine, where it is provided with a suitably supported hand wheel 73. As shown in Figure 17 the bars 69 need extend only a part of the distance across the machine, as it is necessary to adjust each carriage back and forth a sufficient distance to permit the tamping of the ties the desired distance on both sides of the rails.

It will be seen that each of the main carriages is independently adjustable transversely of the machine and is, therefore, adapted to move the tamping tools back and forth, so that by means of the pair of tools carried by each carriage, each tie may be tamped from the center of the track to the end of the tie, although a space of from sixteen inches to two feet at the center of the track is usually not tamped.

*Construction of tool supporting carriage.*

Each tool supporting carriage consists of a pair of T-bars 74, the upper ends of which are supported by a rod 75 engaging slots 76 in pivoted distance bars 77. The lower end of each bar 77 is pivoted at 78 upon the rod 62, forming the lower member of the transverse carriage. The lower portions of the T-bars 74, of the tool carrying carriage each have a pair of brackets 79 riveted thereto, and bars or castings 80, pivoted to the brackets 79 at 81 (Figures 13 and 14) extend downward along each side of the upright web of each T-bar, and at their lower ends are provided with flanges 82 through which extend bolts 83, held in position by nuts 84. These bolts extend through the horizontal flanges of each T-bar and are provided, below said bar, with the coiled or helical springs 85. The castings 80 are provided near their lower ends with bearings for an eccentric shaft 86 having journals 86' and supporting bars 87 have their lower ends journaled upon the shafts 86, while their upper ends are pivotally connected at 88 to the main or transverse carriage. A spring 87' is connected to a lug on the bar 87 and to the transverse rod 63 (Figure 4). A link 89 connects each of the bars 87 with the corresponding distance bar 77. A crank 90 is secured to the shaft 86 and a rod 91 connected to said crank permits the rotation of the shaft 86, and consequently the raising or lowering of the lower end of the supporting carriage, and the two tamping tools carried thereby (Figures 13 and 20), thereby permitting an adjustment of the lower end of the tamping tool to position the tool for the tamping of ties of different widths.

The rod 91 preferably passes through a block 92 (Figure 16) secured upon the upper rod 75 of the tool supporting carriage. It is preferably provided with a series of notches 93 adapted to be engaged by a spring controlled pin 94, which will hold said rod in any position to which it is moved for the purpose of adjusting the tool supporting carriage in a vertical plane, to raise or lower the pair of tamping tools carried by said carriages, as hereinbefore described.

*Tamping tool gun.*

The tamping tool gun or hammer consists preferably of a cylinder 95, one head of said cylinder being formed with a tubular extension 96, constituting a tool holder, arranged to receive and hold a reciprocating tamping tool 97. The end of the tool is suitably shaped to adapt it for tamping the ballast or road bed under the ties. The shank of the tool is preferably provided with a transverse hole, and a collar 99 (Figures 9 and 10) is secured to said tool by a suitable pin 99, which passes through a hole in the collar, and through the hole in the shank of the tool. The collar 98 is provided with an outwardly extending lug 100. The tubular extension 96 of the cylinder is provided with a slot 101, adapted to receive said lug 100. The extension 96 is provided with an opening into which the end of the tool shank fits (Figure 9), and with an opening of larger diameter adapted to receive the collar 98, and the springs 102 and 103, which are placed in said opening, on either side of the collar 98, the heavier and stiffer spring, 103, being placed between the collar 98 and the end of the extension and being held in position by a cap nut 104. The cylinder 95 and its extension 96, and the tool carried thereby, are secured to the webs of the T-bar 74, by means of lugs 105 and 106. This connection between the cylinder and the T-bar which forms the support for the cylinder or gun, by which the tamping tool is operated, permits each cylinder and its extension to be independently adjusted longitudinally of the tool supporting carriage.

Arranged within the cylinder 95 is a piston 107 having a short hammer rod 108 connected thereto. The end of this rod extends into the opening in the extension 96. The cylinder 95 is provided with lugs 109 and 110 to which the tubes 59 and 60, extending from the pulsator, are connected. When the reciprocating piston of the pulsator is in operation and the valve 58 is in the position shown in Figure 4, air is alternately forced into and exhausted from the pipes 59 and 60. Forcing air into the pipe 59 retracts the piston 107, moving it into the position shown in Figure 9, and thereby permitting the spring 103 to withdraw the tamping tool, to as great an extent as possible. Upon the reverse stroke of the pulsator the air is forced into the cylinder 95 on the opposite side of the piston, and said piston is forced to move in the opposite direction.

When the piston reaches the opposite limit of its stroke, the air which will now enter the cylinder 95 between the piston 107 and the end of the cylinder, will force the piston in the opposite direction. As the cylinder of the pulsator is connected to the pipes 59 and 60, leading from the pulsator, the hammer piston 107 reciprocates in the cylinder, and at each movement of the piston in the direction of the tamping tool causes the end of the piston rod hammer 108 to strike a sharp blow on the end of the shank of the tamping tool. This blow will force the tool against the ballast or road bed below the tie (Figure 1). As the tool is driven downward by the blow of the piston hammer the spring 103 is compressed and this spring being more powerful than the spring 102 will by its engagement with the collar 98 immediately raise the tool after it has been moved downward by the blow of the hammer.

*Gun adjusting device.*

Arranged beneath and secured to each T-bar 74, is a cylinder 111 preferably secured rigidly to the under side of said T-bar. I have here shown said parts connected by means of rivets 112 (Figure 1). Each cylinder 111 is provided with a piston 113 (Figure 9) which is connected by a rod 114 to the head of the cylinder 95. It will thus be seen that by moving the piston 113, within the cylinder 111, the cylinder or tool gun 95, and the tool carried thereby may be adjusted to any desired position on the T-bar 74 of the tool supporting carriage.

I prefer to operate the piston 113, to secure the proper adjustment of the tool gun or cylinder 95, by means of compressed air from the tank or reservoir 51.

I have shown, in Figure 9, pipes 115 and 116, leading to the opposite ends of a pair of cylinders 111, carried by the gun supporting carriage. Pipes 117 and 118 lead from a four-way valve 119 (Figure 12) and connect with the pipes 115 and 116. A supply pipe 120 leads from the reservoir 51, and pipe 121 leads to the exhaust. A valve stem 122 and wheel 123, are provided for operating the four-way valve 119. By means of this valve air from the reservoir 51 may be admitted to either end of the cylinders 111, and the piston 113, in either cylinder 111, may be moved to any desired position in said cylinder, and thereby any desired adjustment of the tool gun 95, on the supporting carriage, may be obtained.

I prefer to provide, in the pipes 115 and 116, in proximity to each of the cylinders 111, a suitable shut-off valve 124, and I prefer to provide each of said valves with an operating crank arm 125, and to connect the crank arms of the two valves of the same cylinder with an operating rod 126 (Figures 9 and 11). By this means after air has been admitted to either cylinder and the desired adjustment of the tool gun obtained, the valves 124 for said cylinder may be closed, whereby such adjustment may be maintained indefinitely.

With this arrangement of valves either gun of a pair, upon any main carriage, can be adjusted independently of the other, and may be rigidly held in any position to which it has been adapted.

*Valve operating means.*

Figure 7:
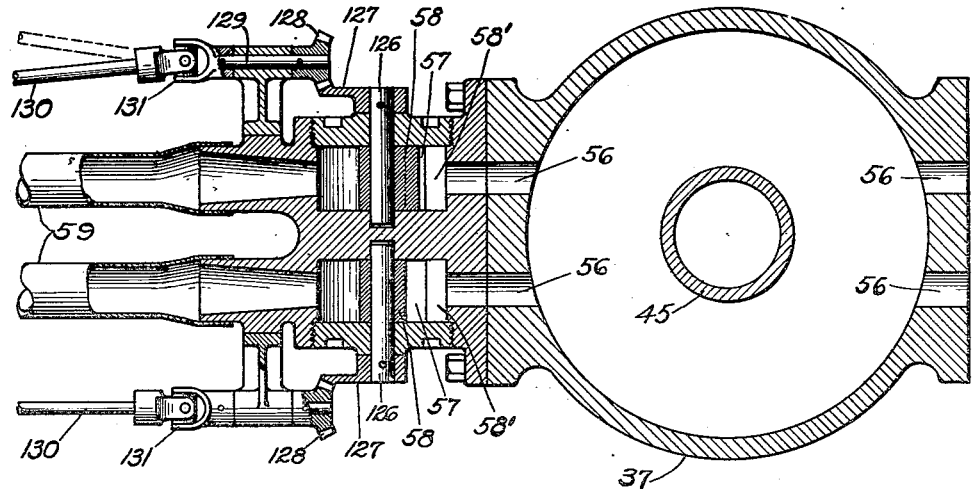
Figure 7 is a horizontal section on line 7—7 of Figure 4, looking in the direction of the arrow.

I prefer to provide each of the valves 58 with a rotatable stem 126 (Figure 7) carrying a gear segment 127 engaged by a beveled pinion 128 mounted upon a short shaft 129. A telescoping operating rod 130 is connected to the shaft 129 by universal joint 131. The opposite ends of the rods 130 are mounted on the transverse rod 63 of the tool supporting carriage, and each of said rods is provided with an operating hand wheel 132 (Figure 3). By this means either of the valves 58 may be turned so as to occupy either of the positions shown in Figure 4, or the position shown in Figure 5, thereby permitting the air, under the opening of the pulsator, to reciprocate the hammer piston of the tool gun, or to pass from one end of the cylinder to the other, through the bypass provided by the adjustment of said valve, as shown in Figure 5.

*Car raising and turning means.*

I prefer to provide means by which the entire car, herein described, may be raised clear of the railroad tracks, and turned around at right angles thereto, when it is desired to remove the same from the track. When the car has been raised and turned around it may be placed upon temporarily arranged short rails and run off across the railroad track, so as to clear said track. For this purpose I have provided at the center of the car a cylinder 133 (Figures 2 and 18), within which is arranged a piston 134, having a piston rod 135, carrying a broad flat head 136 at its lower end. A spring 139 arranged in the cylinder, below the piston, normally holds the piston at the upper end of the cylinder, as shown in Figure 2, and holds the head 136 in the elevated position shown by full lines in said figure. When it is desired to remove the car from the track, loose ties, or short pieces of timber 140, are placed crosswise of the road ties, and the car is moved along until the head 136 comes over said cross ties or pieces of timber. Through a pipe 141, having a controlling valve 142, which extends from the compressed air reservoir 51 to the cylinder 133, air is admitted to the upper end of said cylinder, under sufficient pressure to force the piston downward into contact with the timbers 140, and then to force the cylinder upward carrying with it the car and the mechanism carried thereby, until the car wheels 10 are clear of the track rails. The car may then be turned around at right angles to the track, the piston serving as a pivot, and by placing transverse rails below the wheels 10 the car may be run across the track and onto suitable rails located at the side thereof, thus leaving the track clear for the passage of trains. When the car has been brought above the cross rails the valve 142 (Figure
19) may be turned so as to permit the air to escape from the cylinder 133, thereby causing the piston 134 to be raised to its normal position by the spring 139, and the wheels 10 to drop onto the cross rails.
The car may be pushed along the railroad track by hand, or I may provide one of the axles 9 with a sprocket wheel 143 (Figure 1), connected by a chain 144 to a sprocket 145, arranged upon a short shaft 146 adapted to be connected by clutch members 147 and 148, to the crank shaft 40 of one of the pulsators. By driving the axle, through the means described, the car may be moved along the rails of the railroad track to the point where the device is to be used.

Axle brake.

I may also provide one of the axles with a brake drum 149 (Figure 8), around which extends a brake strap 150, one end of which is secured to the frame of the machine and the other end connected to a brake operating lever 151. This lever is preferably arranged in position to be used by an operator standing on a platform 152. An extra brake lever 154 may be provided connected to the brake band 150 in position to be operated by a workman or operator standing on the ground.

Operator's platform.

I preferably provide two of the platforms 152 (Figure 18) supported upon suitable hinges, so that the same may be folded up out of the way when not in use, or turned down into a horizontal position so that an operator can stand thereon when desired. Suitable chains 153 are connected to the outer edges of these platforms, so as to support the same when turned into a horizontal position.

Car stop.

Figure 8:
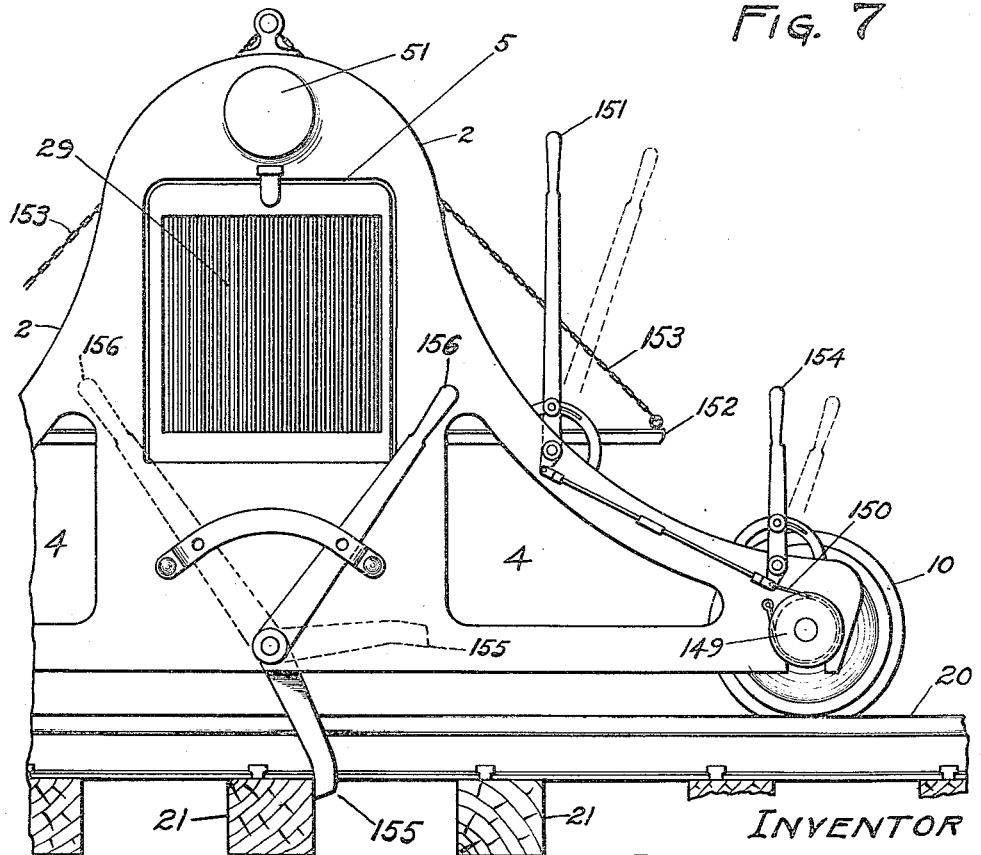
Figure 8 is an elevation of one end of a portion of the machine.
Figure 20:
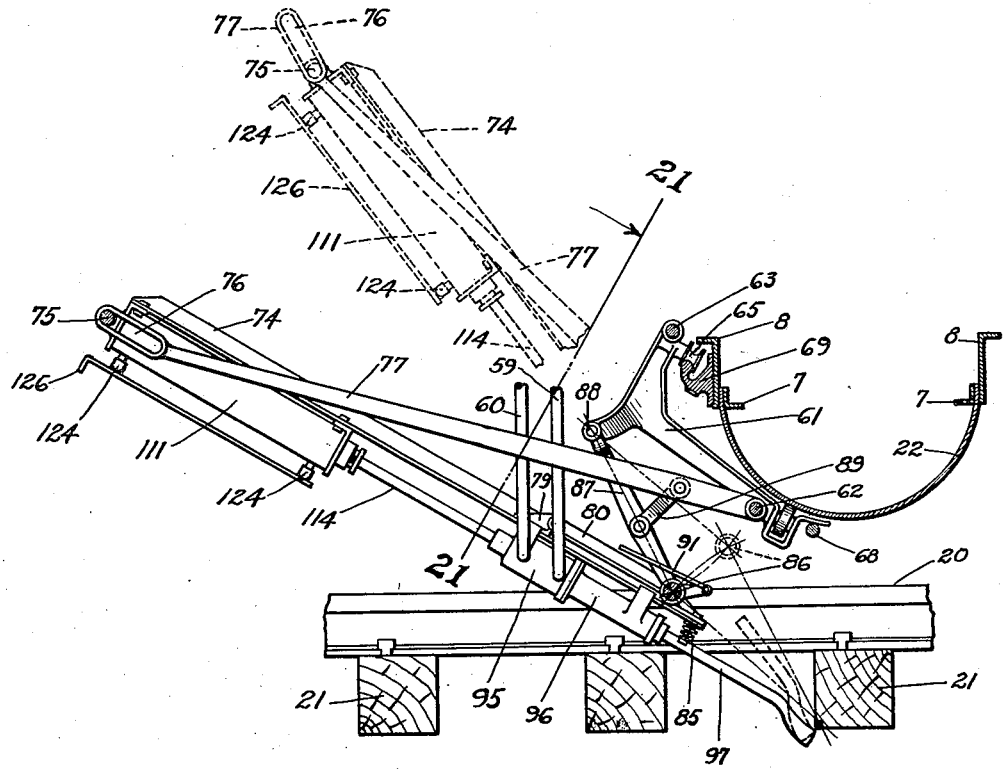
Figure 20 is an elevation and partial section showing one of the main carriages and the means for supporting it upon the transverse base member, and also showing one of the tool supporting carriages in its lowest position and indicating in dotted lines the upper position of said carriage.
Figure 21:
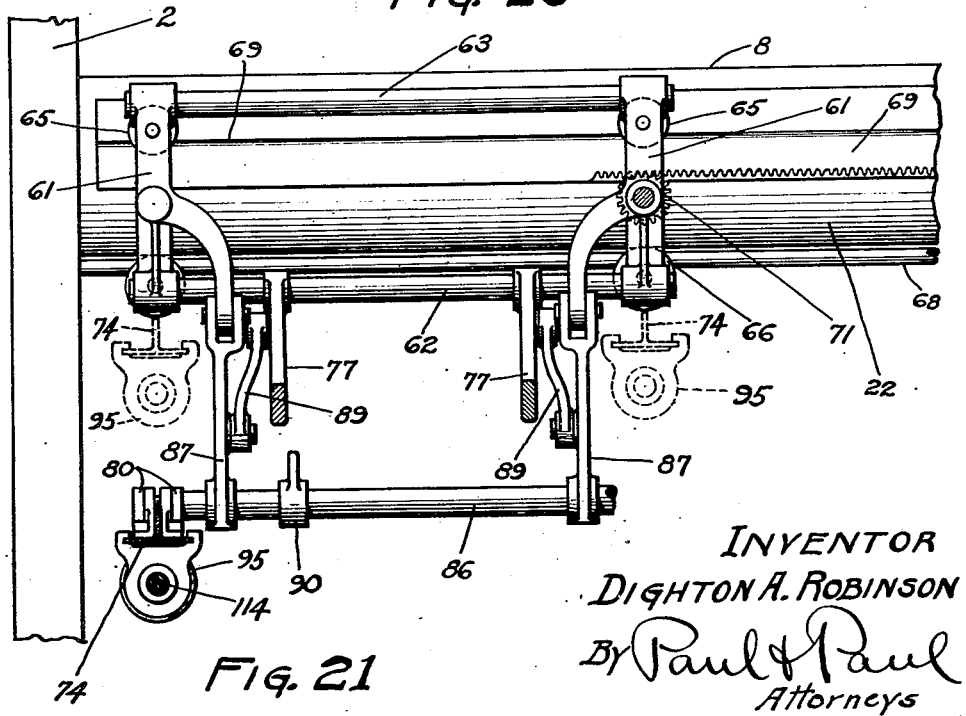
Figure 21 is a transverse section on line 21—21 of Figure 20 in the direction of the arrow.

In order to stop the car in the right relation to a tie, to permit the tools to work under both edges thereof, I prefer to provide a stop lever 155 arranged to be moved by a handle 156 and which may be turned from the position shown in dotted lines in Figure 8 to the position shown by full lines in the same figure. When this lever is turned into the position shown in full lines in Figure 8, and the car is moved so as to bring the lever into contact with the side of the tie, as shown in Figure 8, the machine will be centered over a tie, as illustrated in Figure 1, and will be in position for tamping under both edges of the tie.

Canopy.

As shown in Figure 1 of the drawings I may provide a suitable canopy 160 extending from the top of the base member and enclosing the motor and pulsator. The outline of this canopy is preferably substantially coincident with the openings 5 in the end members of the frame, thus permitting access to the parts within the canopy through these openings.

If preferred suitable doors or coverings may be provided for the openings 5 in the end members of the frame.

General construction.

I prefer to construct the frame of the machine and its supporting wheels in the form of a light pressed steel car carried on standard light pressed steel wheels mounted on hollow drawn steel axles by which all of the parts of the mechanism are supported. Parts of the mechanism may be constructed of aluminum in which case the weight of the full sized device will usually be approximately 3000 pounds. If the motor base and the pulsator are formed of iron the weight will be about 3500 pounds.

As stated, I may use an ordinary gasoline motor, or engine, rating 30 to 40 H. P., which is sufficient for all purposes as the pulsator operation is of light duty. Moreover, the tamping guns will ordinarily be cut out at frequent intervals, and the compressor feature will require only 5 per cent of the power.

Operation.

The general operation of the machine will be understood from the foregoing description of the construction.

Ordinarily the road-bed will be tamped for a distance of about 20" on each side of each rail, the center of the road-bed being preferably left untamped.

While the tamping tools may be operated at any position of the tool supporting carriage, I contemplate, in ordinary use, operating the tamping tools in only two positions. With the tool supporting carriage raised to its highest position, that is, the position nearest the vertical, the ballast will be tamped nearly vertically along the edge of the tie. The position of this carriage, in this operation, will be substantially that indicated by the dotted lines in Figure 20. The tool supporting carriage may then be dropped to its lowest position, indicated in full lines in Figure 20, and the operation of the tamping tool then will approximate a horizontal, and the material will be tucked under the bottom of the tie, as indicated at the center in Figure 1 of the drawings. When the operation is completed the ballast under the tie will be tamped closely together as indicated at the right in Figure 1.

As the tamping tool is swung up and down, in a vertical plane, the position of the point of the tool remains unchanged in the two extreme positions of the tool. This is illustrated by the full and dotted lines in Figure 20. The tool supporting carriage turns on a center practically coincident with the point of the tool, and which would be exactly coincident except for the slight offset at the point of the tool.

It will thus be seen that in moving the tool from one extreme position to the other there is no change in its working point. This is considered to be an important feature in the construction and operation of the machine.

In maintaining a road-bed it is necessary to raise the low points of the track. This will leave open spaces under the ties, as indicated at the left in Figure 1. These openings must be filled by the operation of the tamping machine and the material under the ties must be tamped very closely together.

One operator will be required to handle each swinging carriage, or four operators to each machine. The tool carrying carriages will be raised and lowered by the hand of the operator. Said carriages will in operation be preferably counterbalanced, so as to make it easy for the operator to handle the same. The main carriage may be moved towards the center of the machine, and track, or away from the center by the rack and pinion, and the operating rod extending to the outer end of the swinging carriage.

The machine may be moved onto a side track to permit the passage of trains, or it may be elevated by means of the centrally arranged air cylinder and piston, and turned around at right angles to the track, and then dropped onto some light rails by means of which it may be run across and off the track.

The details of construction may be varied in many particulars without departing from my invention.

I claim as my invention:

1. In a machine of the class described, the combination, with a suitable wheel-supported frame, and a transversely extending base member having its ends secured to said frame, of a transversely movable main carriage mounted upon said base member, a tool supporting carriage arranged in an inclined position, and suspended upon said main carriage, and capable of being adjusted in a vertical plane, and a tamping-tool and tool gun carried by said supporting carriage.

2. In a machine of the class described, the combination, with a wheel supported frame, a motor, and a pulsator mounted thereon, of a transversely movable main carriage, a tool supporting carriage, mounted on said main carriage, and arranged to swing in a vertical plane, a tamping tool carried by said carriage, and an air gun, operated by said pulsator, and connected with said tamping tool for operating the same.

3. In a machine of the class described, the combination, with a wheel supported frame, a motor, and a pulsator mounted thereon, of a pair of transversely movable main carriages, supported on said frame and each arranged to move back and forth towards the center of the frame, from one side thereof, a tool supporting carriage carried by each main carriage, and arranged to swing in a vertical plane, a tamping tool carried by said carriage, and an air gun, operated by said pulsator, and connected with said tamping tool for operating the same.

4. In a machine of the class described, the combination, with a wheel supported frame, a motor, and a pulsator mounted thereon, of a transversely movable main carriage, a tool supporting carriage, mounted on said main carriage, and arranged to swing in a vertical plane, turning about a center located at the working point of the tool, a tamping tool carried by said carriage, and an air gun operated by said pulsator, and connected with said tamping tool for operating the same.

5. In a machine of the class described, the combination, with a wheel supported frame, a motor, and a pulsator mounted thereon, of a pair of transversely movable main carriages, supported on said frame, and each arranged to move back and forth towards the center of the frame, from one side thereof, a tool supporting carriage carried by each main carriage, and arranged to swing in a vertical plane, turning about a center located at the working point of the tool, a tamping tool carried by said carriage, and an air gun operated by said pulsator, and connected with said tamping tool for operating the same.

6. In a machine of the class described, the combination, with a supporting frame, wheels supporting said frame, and a transversely extending base member, concave in cross section, having its ends secured to the side walls of said frame, and arranged with its concave side uppermost, of a track rail arranged parallel with the upper portion of said base member, a transversely movable carriage supported upon said track rail, and having a bearing wheel engaging the convex surface of said base member, means for reciprocating said carriage upon said track rail, a tamping tool supported by said carriage, and means for operating said tool.

7. In a machine of the class described, the combination, with a suitable frame, wheels supporting said frame, and a transversely extending base member, concave in cross section, having its ends secured to the side walls of said frame, and arranged with its concave side uppermost, of a track rail arranged parallel with the upper portion of said base member, a pair of transversely movable carriages supported upon said track rail, and having bearing wheels engaging the convex surface of said base member, means for independently reciprocating each carriage upon said track rail, towards the center of said frame, from one side thereof, tamping tools carried by said carriages, and means for operating said tools.

8. In a machine of the class described, the combination, with a supporting frame, wheels supporting said frame, and a transversely extending base member, concave in cross section, having its ends secured to the side walls of said frame, and arranged with its concave side uppermost, of track rails arranged parallel with the upper portions of said base member and at each side thereof, a pair of transversely movable carriages supported upon each track rail, and having bearing wheels engaging the convex surface of said base member, means for independently reciprocating each carriage upon its supporting track rail towards the center of said frame, from one side thereof, tamping tools carried by each carriage, and means for operating said tools.

9. In a machine of the class described, the combination, with a suitable frame, wheels supporting said frame, and a transversely extending base member having its ends secured to the side walls of said frame, of a track rail arranged parallel with the upper portion of said base member, a transversely movable carriage mounted upon said track rail, and having bearing wheels engaging the under surface of said base member, means for reciprocating said carriage upon said track rails towards the center of said frame, from one side thereof, tamping tools carried by said carriage, and means for operating said tools.

10. In a machine of the class described, the combination, with a suitable wheel supported frame, of a transversely extending track rail supported upon said frame, a pair of transversely movable carriages mounted upon said track rail, means for reciprocating each carriage independently of the other upon said track rail a limited distance towards the center of said frame, from one side thereof, tamping tools carried by each carriage, and means for operating said tools.

11. In a machine of the class described, the combination, with a suitable wheel supported frame, of a transversely extending track rail supported upon said frame, a transversely movable carriage mounted upon said track rail, means for reciprocating said carriage upon said track rail, a tool supporting carriage mounted on said main carriage and arranged to swing in a vertical plane, turning about a center located at the working point of the tool, a tamping tool carried by said carriage, an air gun connected with said tamping tool for operating the same, and means for operating said air gun.

12. In a machine of the class described, the combination, with a suitable wheel supported frame, of a transversely extending track rail supported upon said frame, a transversely movable main carriage mounted upon said track rail, a tool supporting carriage supported on said main carriage and arranged to swing in a vertical plane, turning about a center located at the working point of the tool, a tamping tool carried by said tool supporting carriage, an air gun connected with said tamping tool for operating the same, means for operating said air gun, and means for adjusting said air gun lengthwise on said tool supporting carriage.

13. In a machine of the class described, the combination, with a suitable wheel supported frame, of a transversely extending track rail supported upon said frame, a transversely movable main carriage mounted upon said track rail, a tool supporting carriage supported on said main carriage and arranged to swing in a vertical plane, turning about a center located at the working point of the tool, a tamping tool carried by said tool supporting carriage, an air gun connected with said tamping tool for operating the same, means for operating said air gun, and air controlled means for adjusting said air gun lengthwise on said tool supporting carriage.

14. In a machine of the class described, the combination, with a suitable wheel supported frame, and a pair of transversely extending track rails mounted thereon, of a pair of main carriages on each track rail, means for adjusting said carriages towards and from the center of the frame, a tool supporting carriage, suspended from each main carriage, and movable in a vertical plane, turning about a center located at the working point of the tool, a tamping tool and tool operating gun, mounted on said carriage, and means for operating said gun.

15. In a machine of the class described, the combination, with a frame, and a pair of transversely extending track rails supported by said frame, of a main carriage supported upon each rail, said carriages being inclined towards each other, and adjustable to and from the center of the frame, a tool supporting carriage suspended from each main carriage and arranged to swing in a vertical plane, turning about a center located at the working point of the tool, a tamping tool mounted on each carriage with the working ends of the tools on the opposite carriages arranged to operate at the opposite sides of the same tie.

16. In a machine of the class described, the combination, with a frame and a pair of transversely extending track rails supported by said frame, a pair of main carriages supported on each rail, the carriages upon one rail being oppositely inclined to the carriages upon the other rail, means for adjusting each carriage upon its supporting rail towards and from the center of the frame, a tool carrying carriage supported from each main carriage and arranged to swing in a vertical plane, turning about a center located at the working point of the tool, a pair of tamping tools spaced apart and mounted on each tool carrying carriage, and arranged to operate simultaneously on opposite sides of a road rail.

17. In a machine of the class described, the combination, with the frame and its supporting wheels, of a pulsator mounted on said frame and having a cylinder, with an operating piston therein, said cylinder being provided, on each side of said piston, with a plurality of ports, tubes leading from each pair of ports to an air-gun, means arranged to connect any pair of ports, disconnecting the same from the tubes leading to the co-operating air-gun, and a tamping tool connected with each air-gun.

18. In a machine of the class described, the combination, with the pulsator cylinder and piston, said cylinder being provided with a plurality of ports at each side of said piston, of a tamping tool air gun connected with each pair of ports leading from said cylinder, means for forming at will a connection between any pair of said ports, and simultaneously cutting off the connection to the corresponding air gun.

19. In a machine of the class described, the combination, with the pulsator cylinder and piston, said cylinder being provided with a plurality of ports at each side of said piston, of a tamping tool air gun connected with each pair of ports leading from said cylinder, means for forming at will a regulated connection between any pair of said ports, and simultaneously cutting off the connection to the corresponding air gun.

20. In a machine of the class described, the combination, with a suitable frame, of a pulsator mounted thereon, tamping tools connected with said pulsator to be operated thereby, a compressed air reservoir, and means connecting the pulsator cylinder with said reservoir, whereby said pulsator, while operating said tamping tool, will maintain a predetermined air pressure in said reservoir.

21. In a machine of the class described, the combination, with a suitable frame, of a pulsator mounted thereon, tamping tools a pulsator mounted thereon, tamping tools connected with said pulsator to be operated thereby, a compressed air reservoir, means connecting the pulsator cylinder with said reservoir, whereby said pulsator while operating said tamping tool, will maintain a predetermined air pressure in said reservoir, and means connected with said reservoir and operated by pressure of the air therein for adjusting the position of said tamping tools.

22. In a machine of the class described, the combination, with a truck frame, and wheels supporting the same, of tie tamping tools, supported upon said frame, and means for vertically adjusting said truck frame upon said wheels whereby all of the tamping tools are simultaneously raised or lowered, to adapt said machine for tamping ties carrying rails of different depths.

23. In a machine of the class described, the combination, with the inclined vertically swinging carriage and tamping tool supported thereon, of yielding means carrying the lower end of said carriage and permitting a downward yielding movement of said carriage and its tamping tool when, in operation, said tool strikes the corner of a tie being tamped.

24. In a machine of the class described, the combination, with a transversely adjustable main carriage, of a tamping tool supporting carriage arranged to swing in a vertical plane and inclined in respect to the surface of the track to be operated upon, and yielding means supporting said tool carrying carriage upon said main carriage permitting a downward yielding movement of the lower end of the tamping tool, when in operation said tool strikes the corner of a tie being tamped.

25. In a machine of the class described, the combination, with a transversely adjustable main carriage, of a tamping tool supporting carriage suspended from said main carriage, a tamping tool mounted upon said supporting carriage, and a rotatable eccentric for adjusting the lower end of said tamping tool in a vertical plane to position said tool for tamping ties of different widths.

26. In a machine of the class described, the combination, with a transversely adjustable main carriage, of a tamping tool supporting carriage arranged in an inclined position, suspending bars pivotally secured to said main carriage and an adjustable connection between said suspending bars and said tool supporting carriage, whereby the lower end of the tool supporting carriage and the tamping tool may be adjusted in a vertical plane to position the tamping tool for tamping ties of different widths.

27. In a machine of the class described, the combination, with a tool supporting carriage, of a pair of tamping tools carried thereby, pneumatically actuated tool guns for operating said tamping tools, a tool gun adjusting cylinder for each air gun, and means for independently controlling the passage of air to each adjusting cylinder, whereby said air guns may be simultaneously or independently adjusted and locked in any position.

28. The combination, with the inclined carriage, and the air gun, and tamping tool supported thereon, also in an inclined position, of the pulsator provided with an upright cylinder having a reciprocating piston arranged therein, tubes connecting said cylinder with said air gun, the tube from the port of the pulsator below the piston being connected to the upper part of the air gun, and the tube from the port of the pulsator above the piston being connected to the lower part of the air gun, for the purpose set forth.

29. The combination, with a car-wheel supported frame, and oppositely arranged tamping tools, carried thereby, and arranged to operate simultaneously on opposite sides of the same tie, of a stop device arranged upon said frame and between the oppositely arranged tamping tools and constructed to be swung downward into position to engage the side of the tie to be tamped, thereby locating said frame with the tools in tamping position.

30. The combination, with a car-wheel supported frame, and a tamping tool carried thereby and arranged to tamp material at the side of a tie, of a stop device arranged upon said frame and constructed to be swung downward into engagement with the side of the tie to be tamped, thereby locating said frame with the tool in tamping position.

In witness whereof, I have hereunto set my hand this 14th day of December, 1921.

DIGHTON A. ROBINSON.